(12) United States Patent
Chacko et al.

(10) Patent No.: US 10,128,054 B2
(45) Date of Patent: Nov. 13, 2018

(54) LINEAR-HYPERBRANCHED POLYMERS AS PERFORMANCE ADDITIVES FOR SOLID ELECTROLYTIC CAPACITORS

(71) Applicant: Kemet Electronics Corporation, Simpsonville, SC (US)

(72) Inventors: Antony P. Chacko, Simpsonville, SC (US); Gopakumar Sivasankarapillai, Washington Crossing, PA (US); Yaru Shi, Simpsonville, SC (US); Philip M. Lessner, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 54 days.

(21) Appl. No.: 15/149,720

(22) Filed: May 9, 2016

(65) Prior Publication Data

US 2016/0254099 A1    Sep. 1, 2016

Related U.S. Application Data

(62) Division of application No. 14/098,664, filed on Dec. 6, 2013, now Pat. No. 9,378,898.

(60) Provisional application No. 61/734,938, filed on Dec. 7, 2012, provisional application No. 61/845,754, filed on Jul. 12, 2013.

(51) Int. Cl.
*H01G 9/00* (2006.01)
*H01B 1/00* (2006.01)
(Continued)

(52) U.S. Cl.
CPC .............. *H01G 9/0425* (2013.01); *C09D 5/24* (2013.01); *C09D 177/12* (2013.01); *H01B 1/124* (2013.01);
(Continued)

(58) Field of Classification Search
CPC . H01B 1/00; H01B 1/124; H01B 1/20; H01G 9/00; H01G 9/04; H01G 11/22; H01G 11/30; H01G 11/48
See application file for complete search history.

(56) References Cited

U.S. PATENT DOCUMENTS 5,300,575 A    4/1994   Jonas et al.
5,415,893 A    5/1995   Wiesarman et al.
(Continued)

FOREIGN PATENT DOCUMENTS

WO    WO 03/087222 A1 * 10/2003

OTHER PUBLICATIONS

Kakimoto et al "Hyperbranched poly(ether sulfones)s: preparation and application to ion-exchange membranes", Polymer Journal (2010) 42, 697-705. (Year: 2010).*

(Continued)

*Primary Examiner* — Mark Kopec
(74) *Attorney, Agent, or Firm* — Joseph T. Guy; Patent Filing Specialist, Inc.

(57) ABSTRACT

Provided herein is an improved capacitor and a method for forming an improved capacitor. The method includes providing an anode and forming a dielectric on the anode. A linear-hyperbranched polymer is formed and a conductive polymer dispersion is prepared comprising at least one conducting polymer, one polyanion and the linear-hyperbranched polymer. A layer of the conductive polymer dispersion if formed wherein said dielectric is between the anode and the layer.

28 Claims, 4 Drawing Sheets

Related U.S. Application Data

(51) Int. Cl.
*H01G 9/042* (2006.01)
*H01B 1/12* (2006.01)
*H01G 9/028* (2006.01)
*H01G 9/15* (2006.01)
*C09D 5/24* (2006.01)
*C09D 177/12* (2006.01)

(52) U.S. Cl.
CPC ........... *H01G 9/0029* (2013.01); *H01G 9/028* (2013.01); *H01G 9/15* (2013.01); *Y10T 29/417* (2015.01)

(56) References Cited

U.S. PATENT DOCUMENTS

| | | |
|---|---|---|
| 6,752,964 B1 | 6/2004 | Grubbs et al. |
| 6,987,663 B2 | 1/2006 | Merker et al. |
| 7,990,684 B2 | 8/2011 | Sugihara et al. |
| 2010/0188802 A1* | 7/2010 | Yoshida ............... C08G 61/124 361/525 |
| 2010/0254072 A1 | 10/2010 | Nobuta et al. |
| 2010/0308281 A1* | 12/2010 | Zheng ................. C08L 101/005 252/519.33 |
| 2012/0057275 A1 | 3/2012 | Intelmann et al. |
| 2012/0069492 A1 | 3/2012 | Biler et al. |
| 2012/0206860 A1 | 8/2012 | Chen et al. |

OTHER PUBLICATIONS

Nogami et al "The effects of hyperbranched poly(siloxanes)s on conductive polymer aluminum solid electrolyte capacitors", Journal Power Sources 166 (2007) 584-589. (Year: 2007).*

ISA/KR; International Search Report and Written Opinion for Applicant KEMET Electronics Corporation; PCT/US2013/073495; dated Mar. 28, 2014.

* cited by examiner

LINEAR-HYPERBRANCHED POLYMERS AS PERFORMANCE ADDITIVES FOR SOLID ELECTROLYTIC CAPACITORS

CROSS-REFERENCE TO RELATED APPLICATIONS

The present invention claims is a divisional application of U.S. patent application Ser. No. 14/098,664 filed Dec. 6, 2013 now U.S. Pat. No. 9,378,898 issued Jun. 28, 2016 which, in turn, claims priority to expired U.S. Provisional Patent Application No. 61/734,938 filed Dec. 7, 2012 and to expired U.S. Provisional Patent Application No. 61/845,754 filed Jul. 12, 2013 all of which are incorporated herein by reference.

BACKGROUND

The present invention is related to an improved material for use as a performance additive in the conductive polymeric cathode of solid electrolytic capacitors.

Solid electrolytic capacitors are widely used throughout the electronics industry. In high voltage applications solid electrolytic capacitors with solid electrolytes, such as conductive polymer dispersions, give excellent high voltage performance compared to conductive polymer cathodes formed in-situ. These conductive polymer dispersions are prepared by polymerizing various conductive monomers in the presence of polyanions such as polystyrene sulphonic acid. Descriptions of these can be found in U.S. Pat. Nos. 5,300,575 and 7,990,684 and U.S. Pat. Publ. No. 2012057275 each of which is incorporated herein by reference. Conductive polymer dispersions suitable for solid electrolytic capacitors comprise polyethylene dioxythiophene:polystyrene sulfonic acid (PEDOT:PSSA), binders, additives, etc. Binders and additives provide the film forming, adhesion, and coating properties to these dispersions for applications in solid electrolytic capacitors.

U.S. Pat. No. 5,300,575, which is incorporated herein by reference, describes the use of polymeric binders for better adhesion and scratch resistance. Described therein is the use of polymeric binders soluble or suspended in water with the conductive polymer polyanion dispersions PEDOT:PSSA. Also described are polymer dispersions or lattices which are straight chain, branched or crosslinked polymers.

U.S. Pat. No. 6,987,663, which is incorporated by reference, describes several polymeric binders with PEDOT:PSSA dispersions. Binders listed include such materials as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid esters, vinyl acetate/acrylic acid ester and ethylene/vinyl acetate copolymers, polybutadienes, polyisoprenes, polystyrenes, polyethers, polyesters, polycarbonates, polyurethanes, polyam ides, polyim ides, polysulphones, melamine formaldehyde resins, epoxide resins, silicone resins or celluloses. The polymeric organic binder described therein include those which may be produced by adding crosslinking agents, such as melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins and subsequent crosslinking. Crosslinking products of this type suitable as polymeric binders may also be formed, for example, by reacting the added crosslinking agents with the polymeric anions.

U.S. Pat. No. 5,415,893, which is incorporated herein by reference, describes the use of polymeric binders including polyester resin, polyurethane resins, acrylate resins, etc. in conductive polymer dispersions. U.S. Pat. No. 6,752,964, which is incorporated herein by reference, describes the use of a combination of conductive material, such as PEDOT:PSSA, and nonconductive polymeric materials such as poly (dienes), poly(alkenes), poly(acrylics), poly(methacrylics), poly(vinyl ethers), poly(vinyl thioethers), poly(vinyl alcohols), poly(vinyl ketones), poly(vinyl halides), poly(vinyl nitrites), poly(vinyl esters), poly(styrenes), poly(aryines), etc. poly(oxides), poly(carbonates), poly(esters), poly(anhydrides), poly(urethanes), poly (sulfonate), poly(siloxanes), poly (sulfides), poly(thioesters), poly(sulfones), poly(sulfonamides), poly(amides), poly(ureas), poly(phosphazens), poly(silanes), poly(silazanes), etc. poly(furantetracarboxylic acid diimides), poly(benzoxazoles), poly(oxadiazoles), poly (benzothiazinophenothiazines), poly(benzothiazoles), poly (pyrazinoquinoxalines), poly(pyromenitimides), poly(quinoxalines), poly(benzimidazoles), poly(oxidoles), poly (oxoisinodolines), poly(diaxoisoindoines), poly(triazines), poly(pyridzaines), poly(pioeraziness), poly(pyridinees), poly(pioeridiens), poly(triazoles), poly(pyrazoles), poly (pyrrolidines), poly(carboranes), poly(oxabicyclononanes), poly(diabenzofurans), poly(phthalides), poly(acetals), poly (anhydrides) and carbohydrates.

The material and process described in the above mentioned references have the disadvantage of higher equivalent series resistance (ESR) and unacceptable ESR shift. The higher viscosity of the polymer layer leads to a higher film thickness. The resulting capacitor has a high moisture sorption due to the hydrophilic nature of the binders and the higher film thickness. Current state of the art commercially available conductive polymer dispersions, suitable for solid electrolytic capacitors, use polyester sulphonic acid as a binder. These binders tend to absorb higher amounts of moisture due to the presence of sulphonic acid functionalities in the binder in addition to those in polyanion PSSA. Higher moisture absorption causes moisture outgassing when capacitors are exposed to the higher temperatures typically seen in board mount conditions. So a need exists for alternative materials which do not have additional sulphonic acid groups. Although binders promote adhesion promotion and coating coverage, a stable dispersion suitable for high performance capacitors needs rheology modifiers, wetting agents, defoaming agents, crosslinkers,etc. Formulators typically add these functional additives to fulfill a desired function. A consequence of the addition of insulative additives is that they could decrease the conductivity of the dispersion and could increase the ESR of the capacitor. It is thus desirable to identify a material or a performance additive which can provide the functions of binder, rheology modifiers, wetting agents, crosslinkers, adhesion promotion, etc. The prior art conductive dispersions do not meet these requirements

SUMMARY OF THE INVENTION

It is an object of the present invention to provide an additive system to improve the performance of the conductive polymer dispersion for use in solid electrolytic capacitors.

It is an object of the present invention to provide an additive system which can provide multiple functions for stable dispersions such as dispersing aid, wetting aid, rheology enhancer, lower viscosity, etc.

It is an object of the present invention to provide an additive system which has multiple functionalities including ester, amide, amine, etc. to provide various end use functions for the dispersion coating.

It has now been found that, surprisingly, certain linear-hyperbranched polymers perform several functions such as adhesion promotion, wetting agent, crosslinker, dispersing agent, rheology modifier, viscosity reducing agent, etc.

It has now been found that, surprisingly, significantly lower viscosity, improved water/alcohol solubility, and very low post reflow ESR can be obtained with certain linear-hyperbranched polymers.

The instant invention provides an additive system which improves the performance of conductive polymer dispersions. Furthermore the inventive dispersion improves ESR and reliability in a solid electrolytic capacitor.

It is an object of the invention to provide improved conductive polymer dispersions for solid electrolytic capacitors.

It is an object of the invention to provide an improved conductive polymer dispersion comprising linear-hyperbranched polymers.

It is another object of the invention to prepare improved capacitors with low ESR and improved moisture sorption properties.

It is another object of the invention to improve capacitors with lower ESR, lower ESR shift, and improved reliability.

It is another objective of the invention to prepare improved conductive polymer dispersions with lower viscosity.

A particular advantage is provided by decreasing the conductive polymer layer film thickness.

These and other advantages, as will be realized, are provided in a method for forming a capacitor. The method includes the steps of:
preparing a linear-hyperbranched polymer;
preparing a conductive polymer dispersion comprising at least one conducting polymer and one polyanion and the linear-hyperbranched polymer; and
applying the conductive polymer dispersion as a cathode layer in a solid electrolytic capacitor.

Yet another advantage is provided in a capacitor comprising:
an anode wherein the anode is a conductor and preferably a valve metal anode or
a conductive compound of a valve metal;
a dielectric coated on the anode; and
a cathode on the dielectric wherein the cathode comprises a conductor, preferably
a conductive polymer or manganese dioxide, and wherein the cathode layer also comprises a linear-hyperbranched polymer.

Yet another advantage is provided in a capacitor comprising:
an anode wherein the anode is a conductor and preferably a valve metal anode or
a conductive compound of a valve metal;
a dielectric coated on the anode; and
a cathode on the dielectric wherein the cathode comprises a conductor, preferably
a conductive polymer or manganese dioxide, and wherein the cathode layer also comprises the reaction product of a linear portion with a hydroxyl amine wherein the linear portion is the reaction product of a diol, an anhydride and an acrylate.

Yet another advantage is provided in a dispersion for forming a conductive coating on a surface comprising a conductive polymer and a linear-hyperbranched polymer.

Yet another advantage is provided in a process of manufacturing a capacitor wherein the process includes:
providing an anode wherein the anode is a conductor and preferably a valve metal or a conductive compound of a valve metal;
forming a dielectric on the anode with a preferred dielectric being an oxide of the anode;
forming a linear-hyperbranched polymer by reacting a diol an anhydride and an acrylate to form a linear portion and then reacting the linear portion with a hydroxyl amine;
forming a dispersion comprising the linear-hyperbranched polymer and a conductor, preferably a conductive polymer; and
forming a cathode by applying a layer of the dispersion on the dielectric.

DETAILED DESCRIPTION

Figure 1:
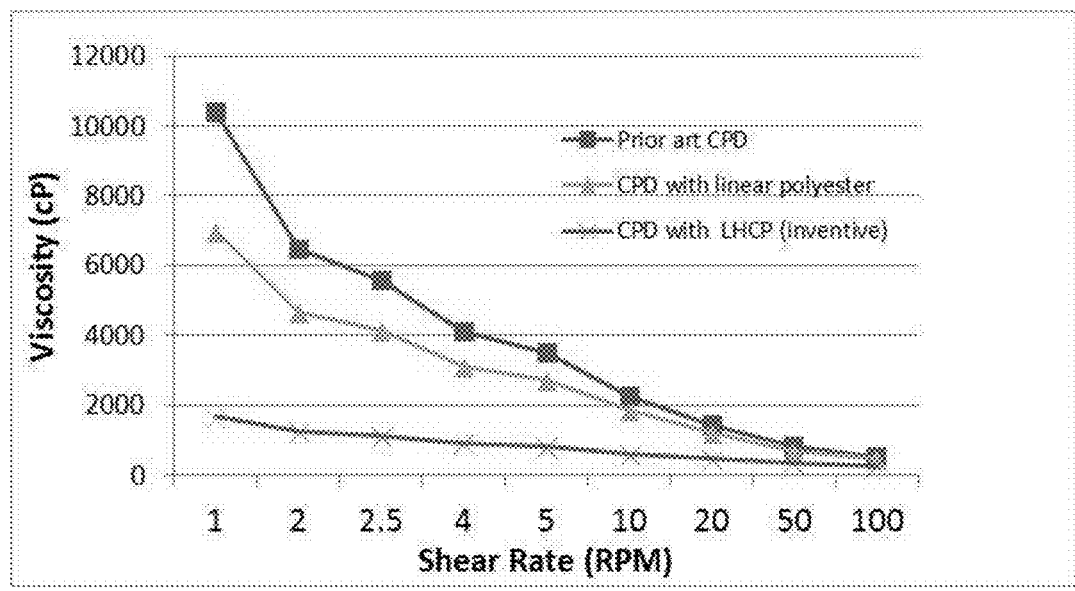
FIG. 1 is a graphical illustration of viscosity as a function of shear rate.

The present invention is related to an improved method for preparing conductive polymer dispersions. More particularly, the present invention is related to the preparation of linear-hyperbranched polymers and their application in conductive polymer dispersions for the formation of a cathode layer on a solid electrolytic capacitor. The construction and manufacture of solid electrolytic capacitors is well documented. In the construction of a solid electrolytic capacitor a valve metal typically serves as the anode. The anode body can be either a porous pellet, formed by pressing and sintering a high purity powder, or a foil which is etched to provide an increased anode surface area. An oxide, preferably of the anode, serves as the dielectric of the capacitor and the dielectric is typically electrolytically formed to cover at least a majority of the surfaces of the anode. The solid cathode electrolyte is typically chosen from a very limited class of materials including manganese dioxide and intrinsically conductive polymers such as polyaniline, polypyrrole, polythiophene, etc. The solid cathode electrolyte is applied so that it covers a majority of the dielectric surfaces. An important feature of the solid cathode electrolyte is that it can be made more resistive by exposure to high temperatures. This feature allows the capacitor to heal leakage sites by Joule heating.

The solid electrolyte is typically not readily adhered to a lead frame or circuit trace so in addition to the solid electrolyte the cathode of a solid electrolyte capacitor typically comprises several layers which are external to the solid electrolyte to facilitate adhesion. These layers typically include a carbon layer; a layer containing a highly conductive metal, typically silver, bound in a polymer or resin matrix; a conductive adhesive layer such as solder or a silver adhesive which is then adhered to a highly conductive metal lead frame. It is important that the solid electrolyte be of sufficient buildup and density to prevent the layers overlaying the solid electrolyte from penetrating the solid electrolyte and contacting the dielectric. One reason for this is that these outer layers do not necessarily exhibit the healing properties required for a material directly in contact with the dielectric. Thus, the ability to control the buildup, morphology, uniformity, and density of the solid electrolyte is critical to the manufacturing of a reliable solid electrolytic capacitor. The various layers of the external cathode also serve to protect the dielectric from thermo-mechanical damage that may occur during subsequent processing, board mounting, or customer use.

The present invention is specific to an improved performance additive wherein the performance additive is a linear-hyperbranched polymer with linear portions therein and pendant groups thereon. Hyperbranched polymers are highly branched macromolecules with 3-dimensional globular structure typically comprising a larger number of terminal functional groups than linear analogues resulting in unique properties such as a lower viscosity and a high solubility. In the present invention the hyperbranched polymer comprises linear sections therein as will be more fully realized from the discussion herein.

In one embodiment the invention includes a solid electrolytic capacitor comprising a linear-hyperbranched polymer where the linear block has at least two reactive end functional groups selected from hydroxyl groups, amino groups, epoxy, etc. In one embodiment the invention includes a solid electrolytic capacitor comprising a linear hyper-branched polymer where the hyper-branched block comprises polyamide-ester-amide, polyesteramide and polyesteramine pendant groups.

In one embodiment the invention includes a solid electrolytic capacitor comprising a linear hyper-branched polymer where the linear block is represented by the segment:

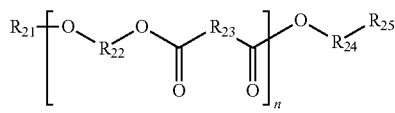

wherein $R_{21}$ and $R_{25}$ are terminating groups preferably those atoms necessary to terminate in —OH, amino, epoxy, etc.; $R_{22}$, $R_{23}$ and $R_{24}$ are independently alkyls or substituted alkyl of 1 to 50 carbons;
n is an integer; and
wherein $R_{21}$, $R_{22}$, $R_{23}$, $R_{24}$, $R_{25}$ and n are selected such that the molecular weight of the linear portion is no more than 1000 and more preferably the molecular weight of the linear-hyperbranched polymer containing the linear block is less than 1000.

In one embodiment the linear-hyperbranched polymer is prepared from bis(2- hydroxypropyl)amine, a linear bifunctional polymer selected from the group of polyethylene glycol, polyester acrylate, polyurethane diol, a carboxylic anhydride selected from the group of glutaric anhydride, phthalic anhydride, succinic anhydride, hexahydropthalic anhydride and hydroxyl alkyl acrylate.

In one embodiment the linear-hyperbranched polymer is prepared from hydroxyl amine with at least one amino group and two hydroxyl groups.

In one embodiment the linear-hyperbranched polymer is prepared from bis(2- hydroxypropyl)amine, a linear bifunctional polymer selected from the group of polyethylene glycol, polyester acrylate, polyurethane diol, a carboxylic anhydride selected from the group of glutaric anhydride, phthalic anhydride, succinic anhydride, hexahydropthalic anhydride.

In one embodiment the linear-hyperbranched polymer comprises hyper-branched polyamide-ester-amide and/or polyesteramide and/or polyesteramine blocks and linear polyester blocks.

In one embodiment a process is provided for preparing a conductive polymer dispersion comprising a dispersion prepared by polymerizing at least one conductive polymer and at least one polyanion, and a hyper-branched linear copolymer.

In one embodiment a process is provided for preparing a conductive polymer dispersion comprising a dispersion prepared by polymerizing at least one conductive polymer and at least one polyanion, and a hyper-branched linear copolymer wherein at least one conductive polymer is an optionally substituted polypyrrole, an optionally substituted polyaniline or an optionally substituted polythiophene.

In one embodiment a process is provided for preparing a conductive polymer dispersion comprising a dispersion prepared by polymerizing at least one conductive polymer and at least one polyanion, and a hyper-branched linear copolymer wherein at least one conductive polymer is polyethlenedioxythiophene. A preferred linear-hyperbranched polymer comprises a bis(2-hydroxyalkyl) amine, such as bis(2-hydroxypropyl) amine or diisopropanolamine coupled polymers formed from the reaction product of a diol, an anhydride and an acrylate. A diol, such as K-PURE CDR 3315, is reacted with an anhydride, such as glutaric anhydride (GA), and an acrylate, such as hydroxyethyl acrylate (HEA). The resulting products react with the amine and hydroxyl group of the diisopropanolamine to form a branched polymer which can subsequently react at reactive groups selected from amines, alcohols and acrylate groups to form secondary branches and beyond.

While described herein as a sequential reaction involving initial formation of the linear portion followed by reaction to add pendant groups this is for conceptual understanding. The linear hyper-branched polymer may be formed by initial formation of the linear portion, either as a separate reaction or in a common vessel with subsequent reactants, followed by reaction to add the pendant groups. Alternatively, the components may be mixed with formation of segments of the linear portion which may be reacted to have pendant groups thereon followed by combination of the linear segments. The order of reaction is likely kinetically controlled and neither limited nor controlled herein with the proviso that the linear hyper-branched polymer is ultimately formed as described herein.

The linear-hyperbranched polymer comprises linear branches formed from the reaction of diols, anhydrides and acrylates.

The diol is defined as OH—$R_1$—OH wherein $R_1$ is a linear alkyl with a molecular weight of no more than 1000.

The anhydride is defined as:

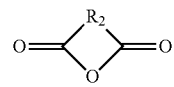

wherein $R_2$ is a linear alkyl of 1 to 6 carbons, which may be substituted, or the atoms necessary to form a ring and particularly an aromatic ring, which may be substituted.

The acrylate is defined by:

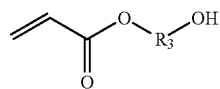

wherein $R_3$ is a linear alkyl of 1 to 50 carbons which may be substituted, an ether or polyether which may be substituted or a combination thereof. More preferably the acrylate is defined by:

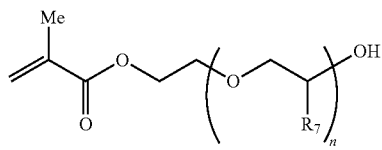

wherein $R_7$ is hydrogen or methyl and n is an integer selected from the integers which are at least 0 to no more than 10. Exemplary acrylates include 2-hydroyethyl methacrylate, 2-hydroyethyl acrylate (HEA), 2,2-bis(hydroxymethyl)propyl acrylate;

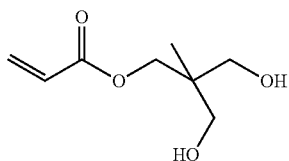

propylene glycol monomethacrylate (MW—405);

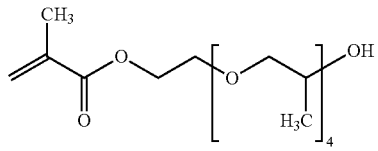

hydroxy ethyl methacrylate (MW—414);

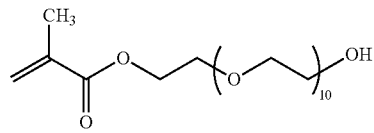

hydroxy ethyl methacrylate (MW—274)

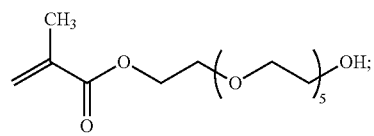

and
hydroxy ethyl methacrylate (MW—190)

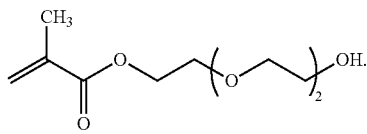

The reaction of the diols, anhydrides and acrylates form a linear portion represented as:

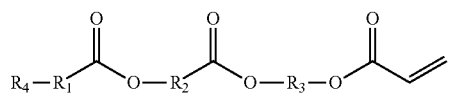

wherein $R_4$ is a hydroxyl, or the reaction product of one of the diol, anhydride or acrylate and $R_1$-$R_3$ are as defined above. It would be understood by those of skill in the art that the linear portion illustrated above is a reaction product and that the order of $R_1$-$R_3$ within the linear chain may be randomly distributed with the representation above representing a major product of the reaction.

The linear portion, in a reaction vessel, is reacted with a hydroxyl amine defined by:

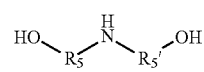

wherein each of $R^5$ and $R^{5'}$ are independently selected from linear alkyls of 1-6 carbons which may be substituted. Exemplary hydroxyl amines include:

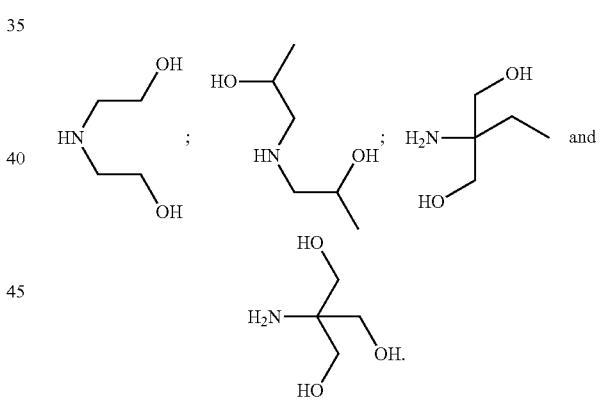

2,2'-iminodiethanol (diethanolamine (DEA)); 2-amino-2-ethyl-1,3-propanediol (AEPO);
2-amino-2-ethylpropane-1,3-diol and 2-amino-2-(hydroxymethyl)propane-1,3-diol (tris-(hydroxymethyl) aminomethane (THAM))

Upon reaction of the linear portion with the hydroxyl amine a Generation zero polymer is formed as defined by:

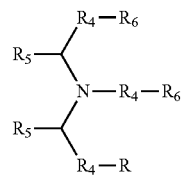

wherein $R_6$ is the linear portion described above and $R_1$-$R_5$ are as described above. Upon further reaction the reactive groups of the linear portions react with hydroxyl amine and additional linear portion to form branching referred to in the art as Generation 1 branching. With further reaction the reactive groups of the linear portions of the Generation 1 branching react with hydroxyl amine and additional linear portion to form branching referred to in the art as Generation 2 branching, etc. Though, in theory, the branching can proceed through many generations the reaction becomes reagent and diffusion limited. Furthermore, if reaction continues to excess the solubility becomes insufficiently low for use in a capacitor.

For the purposes of the present invention the polymerization is ceased when the solubility is within a range suitable for the formation of a coating when formulated as a dispersion with conductive polymer.

For the purposes of the present invention the polymerization is preferably ceased when the acid number is at least 100. In one embodiment is it preferred that the acid number be no more than 1000. In one embodiment is it preferred that the acid number be no more than 500 and preferably no more than 200. Below an acid number of about 100 an insufficient number of acid groups is available for adequate conductivity. An acid number which is to high is indicative of a polymer which is insufficiently polymerized. Acid number is the weight in milligrams of KOH required to neutralize the pendant carboxylate groups in one gram of polymer as set forth in ASTM D974 and ASTM D 604.

A particular advantage of the instant invention is the low level of sulfonate in the binder. Sulfonate is known to enhance water absorption and this can be detrimental to capacitor performance. The present invention allows for a performance additive with less than 10 wt % sulfonate in the binder, more preferably less than 1 percent sulfonate in the binder, more preferably less than 0.1 wt % sulfonate in the binder and even more preferably no sulfonate in the binder. Amines, particularly primary and secondary amines, are also detrimental to water absorption. It is preferred that a low level of primary and secondary amines be maintained in the binder to insure low water absorption. A particular advantage of the instant invention is the low level of amine added to make water dispersible. Higher amounts of neutralizing amine additives are known to be detrimental to electrical properties. In one embodiment it is preferred to have less than 10 wt % primary or secondary amines in the binder and more preferably less than 5%.

The moisture content is measured by the Karl Fisher Test Method. The Karl Fischer coulometric titration method uses Karl Fischer reagent, which reacts quantitatively and selectively with water, to measure moisture content. Karl Fischer reagent consists of iodine, sulfur dioxide, a base and a solvent, such as alcohol. In this test, the moisture containing sample can be mixed with Karl Fischer reagent directly in the titration vessel. Alternatively, the sample can be heated to a higher temperature and the moisture vapor then reacts with the Karl Fischer reagent in the titration vessel. The amount of water is directly proportional to the iodine consumed in the reaction. In the coulometric titration method, iodine is produced through an electrolytic oxidation and can be measured by the quantity of the electricity used. The water content is therefore determined from the coulombs required in the titration. 5 g of the dispersion sample was dried in a 4 inch Al pan at 150° C. (convection oven) for 30 minutes, followed by conditioning at RH 71%, 74° F. for 48+ hours with the sample being sealed until testing. The sample was placed in a Karl Fischer sample holder and the titration was done at 250° C.

An exemplary embodiment is a linear hyper-branched copolymer with ester-amine-amide linkages in a macromolecular structure. The macromolecular structure is unique due to the unique combination of monomers used wherein the first block is linear polyester and the second block is hyperbranched polyesteramine/polyesteramide.

While the use of linear-hyberbranched polymers as performance additives are advantageous for adhesion to the dielectric there is still advantages to be gained in cohesion with the conductive polymer. Solid electrolytic capacitors with higher reliability and high ESR stability continue to be a requirement for demanding electronic circuit applications. Cathode materials with higher adhesion to interfaces and higher cohesion within the cathode layers are important to ensure high reliability and high ESR stability. Cathode materials, specifically conductive polymer layers, with poor adhesion to interfaces causes layer separation/delamination when the capacitor undergoes hydro-thermo-mechanical stress. Cathode materials, specifically conductive polymer layers, with poor cohesion cause intra layer separation when capacitors undergo hydro-thermo-mechanical stresses.

Figure 2:
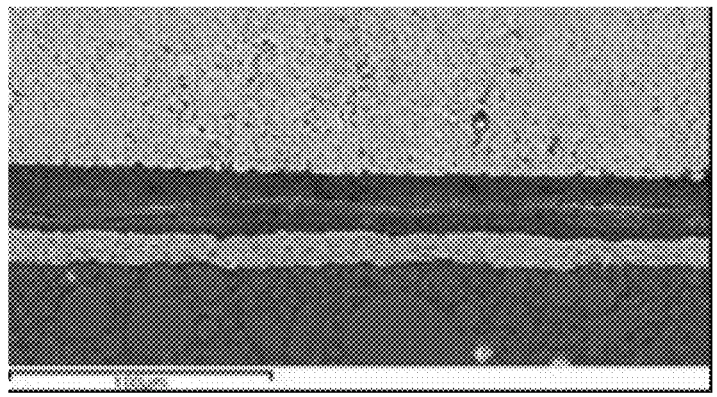
FIG. 2 is a cross-sectional view of a portion of a capacitor.

One method to improve adhesion to the interfaces, especially to metal oxide interfaces, is to have a conducting polymer layer with a higher number of carboxyl and hydroxyl functionalities available for adhesion to the oxide. It is known that hydrogen bonding can take place with the oxide surface with functionalities such as carboxyl and hydroxyl. It is also advantageous to have these functionalities in excess so that a good adhesion between oxide and conducting polymer layer is formed. One disadvantage for such a material is the vulnerability of these functionalities during processing. If reaction is not complete micro-separations can occur during some processing steps, such as hot water washing, even before the parts are exposed to high temperature. FIG. 2 shows a scanning electron microscope (SEM) cross section of a capacitor containing such a layer wherein improved adhesion to the oxide interface is observed with some intra-layer separation.

Figure 3:
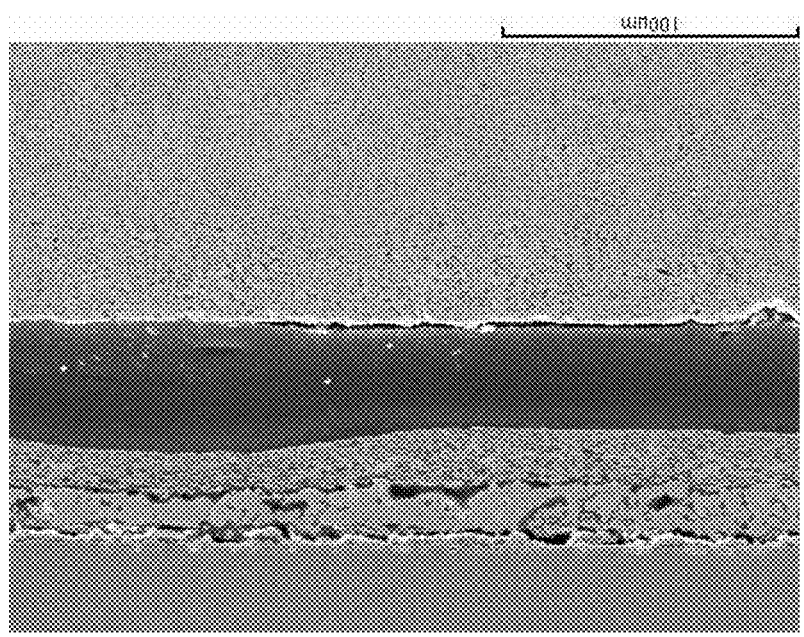
FIG. 3 is a cross-sectional view of a portion of a capacitor.

A method for improving the poor cohesion is to have a conducting polymer layer with highly crosslinkable functionalities which reacts at lower curing temperatures. An example of such a conducting polymer containing crosslinkers is epoxy functional molecules which can be self polymerized or crosslinked with silane and other additives in the conducting polymer dispersion. Epoxy containing polymers tend to be more rigid and a flexible epoxy molecule is needed for flexible conducting polymer layers. Although these materials have an improved cohesion due to enhanced crosslinking within the layers, they have poor adhesion to the oxide interface due to insufficient active functional groups for adhesion to oxide surfaces. Due to the poor adhesion to oxide, these layers tend to separate from the oxide interface when capacitors undergo thermomechancial stress as shown in FIG. 3 wherein provided is a cross-sectional SEM view of a capacitor with improved cohesion but some separation from the oxide surface exist.

The combination of linear-hyperbranched polymers and epoxy based crosslinkers provides a mixture of high adhesion layers and high cohesion layers.

Particularly preferred cross-linkers include: silanes such as 3-glycidoxypropyltrimethoxysilane (Silane)

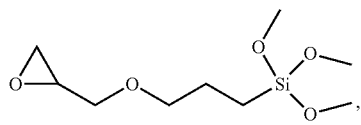

ethylene glycol diglycidyl ether(EDGGE)

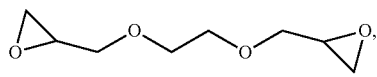 [SMILES: C(COCC1CO1)OCC1CO1]

polyethylene glycol diglycidyl ether (PEDDGE)

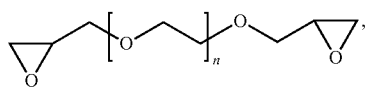

1,4-butanediol diglycidyl ether (BDDGE)

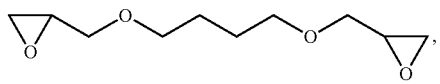

glycerol diglycidyl ether (GDGE)

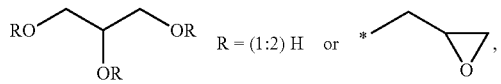

or
sorbitol diglycidyl ether (Sorbitol-DGE)

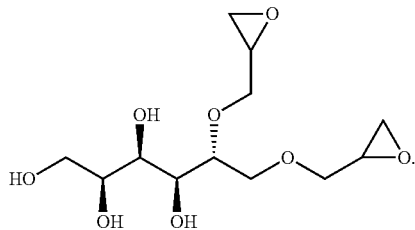 [SMILES: OC[C@H](O)[C@@H](O)[C@H](O)[C@@H](COCC1CO1)OCC1CO1]

A particularly preferred embodiment is provided in a solid electrolytic capacitor comprising a high adhesion layer at the interface between dielectric and polymer and at the interface between polymer and carbon. A high cohesion layer between the high adhesion layers is particularly preferred. The performance enhancing additive preferably has an acid number higher than 130. The high cohesion layer preferably comprises a crosslinker with an acid number of less than 50. A particularly preferred performance enhancing additive is a linear hyper-branched copolymer.

Particularly preferred crosslinkers are selected from a group comprising epoxy functional molecules including epoxy functional polyols, cymel crosslinkers, etc.

Catalysis of the epoxy-carboxyl reaction is described in Catalyst Of The Epoxy-Carboxyl Reaction, Werner J. Blank et al., JCT Vol. 74/926, March 2002, which is incorporated herein by reference.

Particularly preferred epoxy resins include: aliphatic glycidyl ethers available as ERISYS™ GE 5,6,7 and 8 Series; aromatic monoglycidyl ethers available as ERISYS™ GE 10 Series; aliphatic diglycidyl ether available as ERISYS™ GE 20 Series; aliphatic triglycidyl ethers available as ERISYS™ GE 30 Series; sorbitol polyglycidyl ether available as ERISYS™ GE 60; glycidyl esters available as ERISYS™ GS Series and glycidyl amines available as ERISYS™ GA Series.

EXPERIMENTAL RESULTS

Inventive conductive polymer dispersions were prepared comprising PEDOT:PSSA and with performance additives LHCP-B and ERISYS™ GE 60—Sorbitol Polyglycidyl Ether. A series of tantalum anodes (68 microfarads, 16V) using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated until a sufficient thickness was achieved. These anodes were split into two groups. The inventive conductive polymer dispersions was applied 2-4 times to form a thick external layer. A carbon containing layer was applied to the polymer layer. A silver layer was applied. Parts were assembled and ESR was measured before after surface mount and the results are presented in Table 1.

TABLE 1

| Conductive Polymer Dispersion | ESR (mohm) |
|---|---|
| conductive polymer dispersion using linear hyperbranched copolymer | 25.04 |
| conductive polymer dispersion using linear hyperbranched copolymer and sorbitol diglycidyl ether | 19.35 |

Figure 4:
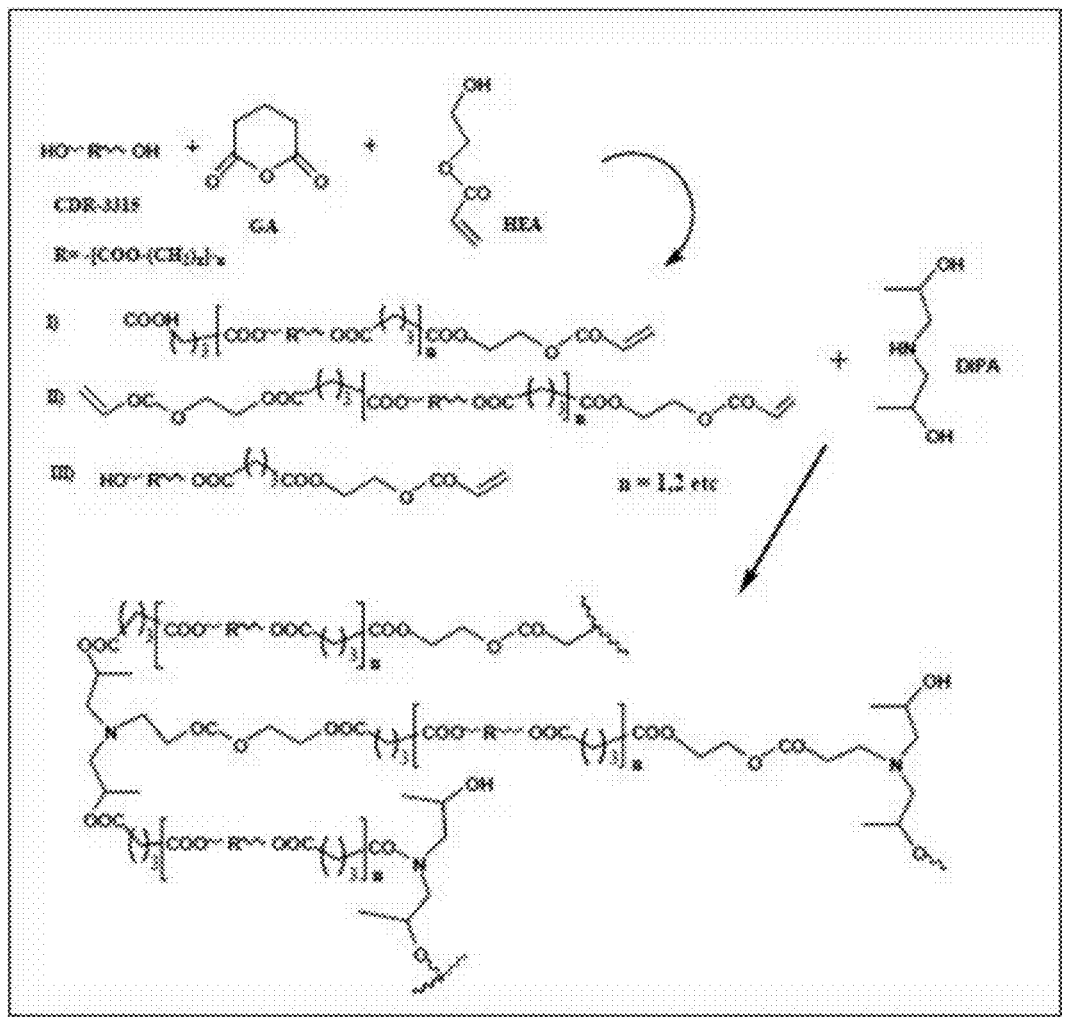
FIG. 4 is a synthetic scheme for preparing a linear-hyperbranched polymer.
Figure 5:
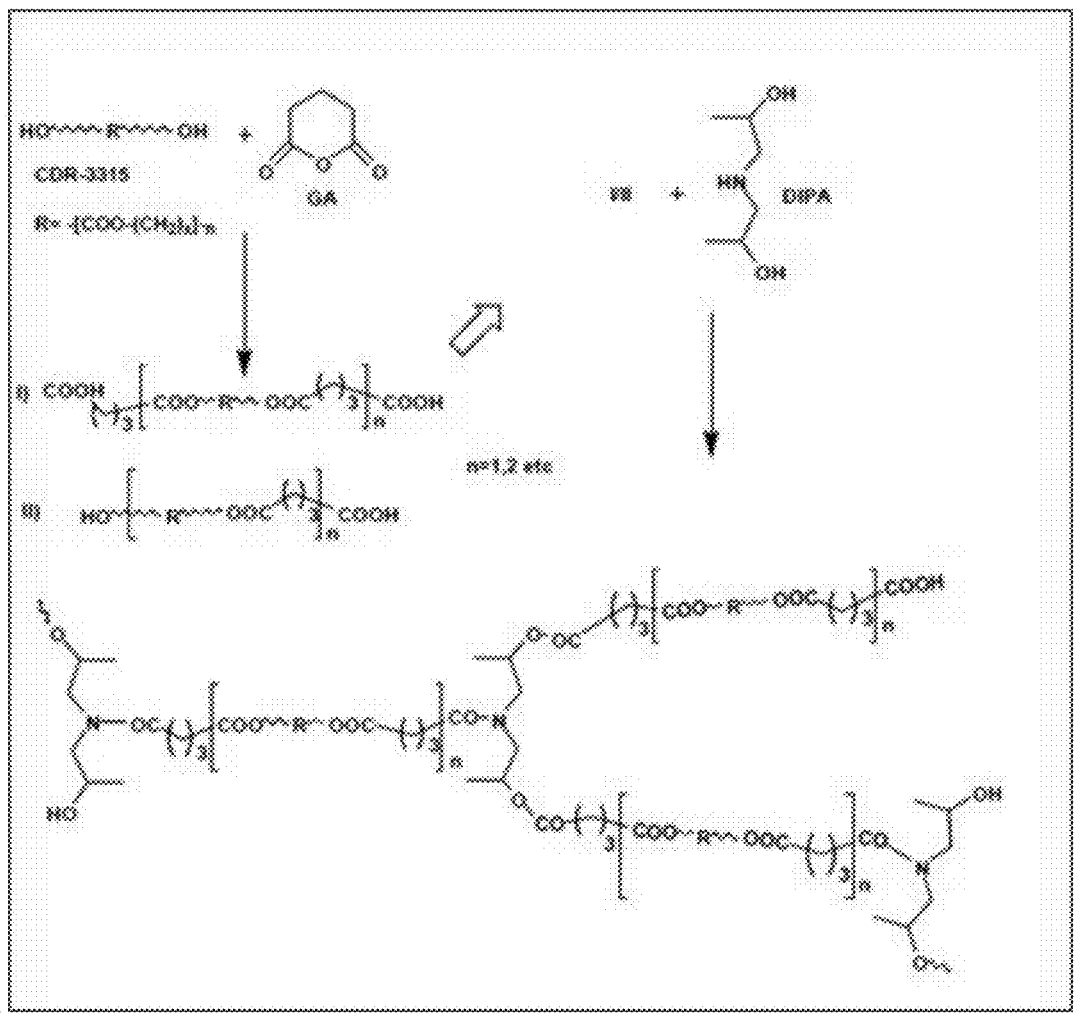
FIG. 5 is a synthetic scheme for preparing a linear-hyperbranched polymer.

The proposed structure for linear hyperbranched polymers are illustrated in FIGS. 4 and 5. FIG. 4 is the proposed structure for Examples 1 and 2 and FIG. 5 is the proposed structure for Example 4.

Preparation of LHCP-A

In the first step of preparation, 100 g of the diol K-PURE CDR-3315 from King Industries, Inc., 29.34 g of hydroxyethyl acrylate (HEA) and 61.85 g of glutaric anhydride (GA) were introduced into a 1 L beaker equipped with nitrogen inlet and mechanical stirrer. The reaction was proceeded at hot plate temperature of 125-130° C. to maintain a reaction mixture temperature of about 100-105° C. for 4 H under a slow stream of nitrogen. Then 16.67 g of bis(2-hydroxypropyl) amine (DIPA) was added into the reaction mixture and the temperature of the hot plate was kept at 120-135° C. to maintain the reaction mixture at a temperature of about 100-105° C. for another 2 H. The highly viscous product was dissolved in water-ethanol for evaluation.

Preparation of LHCP-B

In the first step of preparation, 100 g of the aforementioned CDR-3315, 29.34 g of hydroxyethyl acrylate (HEA)

and 61.85 g of glutaric anhydride (GA) were introduced into a 1 L beaker equipped with a mechanical stirrer and covered with aluminum foil. The reaction was proceeded at hot plate temperature of 125-130° C. to maintain a reaction mixture temperature of about 100-105° C. for 4 H. Then 16.67 g of bis(2-hydroxypropyl) amine (DIPA) was added into the reaction mixture and hot plate was maintained at a temperature of 120-135° C. to maintain a reaction mixture temperature of about 100-105° C. for another 2 H. The highly viscous product was dissolved in water-ethanol for evaluation.

Preparation of LHCP-C

In the first step of preparation, 100 g of the aforementioned CDR-3315, and 61.85 g of phthalic anhydride (PA) were introduced into a 1 L beaker equipped with a mechanical stirrer, nitrogen inlet, and covered with aluminum foil. The reaction was proceeded at a hot plate temperature of 125-130° C. to maintain a reaction mixture temperature of about 100-105° C. for 4 h. Then 16.67 g of bis(2-hydroxypropyl) amine (DIPA) was added into the reaction mixture and the hot plate temperature was maintained at 120-135° C. to maintain the reaction mixture temperature of about 100-105° C. another 2 H. The highly viscous product was dissolved in water-ethanol for evaluation.

Preparation of LHCP-D

In the first step of preparation,100 g of the aforementioned CDR-3315, and 61.85 g of glutaric anhydride (GA) were introduced into a 1 L beaker equipped with nitrogen inlet and mechanical stirrer. The reaction was proceeded at a hot plate temperature of 125-130° C. to maintain a reaction mixture temperature of about 100 -105° C.) for 4 H under a slow stream of nitrogen. Then 16.67 g of bis(2-hydroxypropyl) amine (DIPA) was added into the reaction mixture and the hot plate was maintained at a temperature of about 120-135° C. for another 2 H to maintain the reaction mixture at a temperature of about 100-105° C. The highly viscous product was dissolved in water-ethanol for evaluation.

Comparative Example 1

A series of tantalum anodes (33 microfarads, 25V) using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization, which formed a thin layer of conductive polymer (PEDOT) on the dielectric of the anodes. This process was repeated 6 times. A commercially available conductive polymer dispersion available from Starck H. S. as Clevios KV2 was applied 2-4 times to form a thick external polymer layer. A graphite coating was applied followed by a silver layer. Parts were assembled and ESR before and after surface mount was measured and reported in Table 2 as COMP.

Example 2

A conductive polymer dispersion was prepared comprising PEDOT:PSSA and a commercial linear polyester with an acid number of 45. The commercial linear polyester is not water or alcohol soluble and was neutralized with amine for dispersing in water. A higher acid number polyester requires higher concentration of amine for neutralization. When these water borne linear polyesters are used with highly acidic conductive polymer dispersions the presence of higher concentrations of amine can lead to instability of dispersions and poor electrical properties of solid electrolytic capacitors prepared from them.

Example 3

Inventive conductive polymer dispersions were prepared comprising PEDOT:PSSA and with performance additives LHCP-A, LHCP-B, LHCP-C, LHCP-D. A series of tantalum anodes (33 microfarads, 25V) using two different sets of anodes was prepared. The tantalum was anodized to form a dielectric on the tantalum anode. The anode thus formed was dipped into a solution of iron (III) toluenesulfonate oxidant for 1 minute and sequentially dipped into ethyldioxythiophene monomer for 1 minute. The anodes were washed to remove excess monomer and by-products of the reactions after the completion of 60 minutes polymerization forming a thin layer of conductive polymer (PEDOT) on the dielectric of the anodes. This process was repeated 6 times. The inventive conductive polymer dispersions were applied 2-4 times to form a thick external layer. A carbon containing layer was applied to the polymer layer. A silver layer was applied. Parts were assembled and ESR measured before and after surface mount was measured. Results are provided in Table 2 for ESR post reflow with some results duplicated for use in illustrating reproducibility.

TABLE 2

| Trial | Conductive polymer | ESR (mohm) |
| --- | --- | --- |
| 1 | COMP | 37.20 |
| 1 | LHCP-A | 33.72 |
| 1 | LHCP-A | 30.91 |
| 2 | COMP | 40.53 |
| 2 | LHCP-A | 31.31 |
| 2 | LHCP-A | 31.41 |
| 2 | LHCP-A | 31.59 |
| 2 | LHCP-A | 32.50 |
| 2 | LHCP-C | 31.16 |
| 3 | COMP | 59.10 |
| 3 | LHCP-A | 29.93 |
| 3 | LHCP-A | 30.74 |
| 3 | LHCP-B | 29.37 |
| 3 | LHCP-B | 29.52 |
| 3 | LHCP-B | 31.94 |
| 3 | LHCP-B | 29.76 |
| 3 | LHCP-A | 30.60 |
| 4 | COMP | 46.90 |
| 4 | LHCP-D | 29.39 |
| 4 | LHCP-D | 29.40 |
| 4 | LHCP-D | 28.50 |

In Table 2 the advantages provided by the linear hyperbranched copolymers with regards to ESR and with regards to consistency in ESR are provided.

Inventive examples demonstrate that the ESR of the inventive materials are superior to prior art materials in various trials. These examples also demonstrate the excellent reproducibility between various batches of the novel performance additives. Experiments further demonstrate that these families of polymers give reproducible results irrespective of the synthetic scheme used.

Inventive examples demonstrate that the viscosity of the inventive materials is significantly lower than prior art materials in various trials as illustrated in FIG. 1 wherein provided is viscosity (cP) as a function of shear rate (RPM) for conductive polymer (CPD), conductive polymer with a linear polyester and conductive polymer with a linear hyperbranched co-polymer. Lower viscosity results in lower coating thickness of the materials in the capacitors which leads to lower moisture sorption by the capacitor thereby resulting in improved reliability. By way of illustration, moisture content of a comparative example using commercially available Clevious KV2 as the conductive polymer versus a conductive polymer with a linear hyperbranched co-polymer is provided in Table 3.

TABLE 3

| Conductive polymer dispersion | Moisture Content |
|---|---|
| Clevios KV2 | 17% |
| Inventive (Example 3) | 12% |

Multi-functional hyperbranched polymers are known to be advantageous for adhesion and viscosity reduction, however, the presence of active functional groups would be expected to lead to excessive crosslinks within the hyperbranched polymer matrix and with dopants (PSSA) of the conducting polymers. The excessive crosslinks would be expected to decrease the flexibility of the conductive dispersion coating thereby causing cracks within the coating when exposed to thermomechanical stress which would be expected to lead to an undesirable high ESR. Linear polymers on the other hand can lead to excessive high viscosity due to excessive chain entanglements and reduced adhesion due to less functional groups. The excessive viscosity leading and poor adhesion can cause higher ESR. It was surprisingly found that the use of linear hyperbranched copolymers (LHP) of this invention resulted in excellent ESR performance. It is believed that the presence of linear blocks or linear flexible spaces in the LHP reduce this crack tendency and thus leading to a robust conductive coating with excellent ESR. We have thus found a surprising synergistic improvement in ESR by the choice of LHP polymers when compared to linear polymers or hyperbranched polymers.

The invention has been described with reference to the preferred embodiments without limit thereto. One of skill in the art would realize additional embodiments and improvements which are within the scope of the invention as set forth in the claims appended hereto.

The invention claimed is:

1. A capacitor comprising:
an anode;
a cathode wherein said cathode comprises a linear-hyperbranched polymer
wherein said linear-hyperbranched polymer comprises a linear portion and a hyperbranched portion wherein said linear portion comprises at least two reactive end groups selected from the group consisting of hydroxyl, amino and epoxy; and
a dielectric between said anode and said cathode.

2. A capacitor comprising:
an anode;
a cathode wherein said cathode comprises a linear-hyperbranched polymer
wherein said linear-hyperbranched polymer comprises a linear portion and a hyperbranched portion wherein said linear portion comprises at least one of polyamide-ester-amide, polyesteramide and polyesteramine; and
a dielectric between said anode and said cathode.

3. A capacitor comprising:
an anode;
a cathode wherein said cathode comprises a linear-hyperbranched polymer wherein said linear-hyperbranched polymer comprises a hyperbranched portion and a linear portion wherein said linear portion comprises:

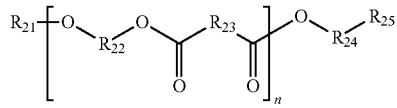

wherein $R_{21}$ and $R_{25}$ are terminating groups;
$R_{22}$, $R_{23}$ and $R_{24}$ are independently alkyls or substituted alkyl of 1 to 50 carbons;
n is an integer; and
wherein $R_{21}$, $R_{22}$, $R_{23}$, $R_{24}$, $R_{25}$ and n are selected such that the molecular weight of said linear portion is no more than 1000; and
a dielectric between said anode and said cathode.

4. The capacitor of claim 3 wherein said anode comprises
a valve metal or
a conductive compound of said valve metal.

5. The capacitor of claim 3 wherein said cathode comprises a conductive polymer or manganese dioxide.

6. The capacitor of claim 3 wherein said dielectric is an oxide of said anode.

7. The a capacitor of claim 3 wherein said linear-hyperbranched polymer is a reaction product of a diol and an anhydride to form a linear portion.

8. The capacitor of claim 7 wherein said diol is OH—$R_1$—OH wherein $R_1$ is a linear alkyl.

9. The capacitor of claim 7 wherein said anhydride is defined by:

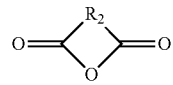

wherein $R_2$ is a linear alkyl of 1 to 6 carbons, which may be substituted, or the atoms necessary to form a ring which may be substituted.

10. The capacitor of claim 9 wherein said ring is an aromatic ring.

11. The capacitor of claim 7 further comprising reacting with an acrylate wherein said acrylate is defined by:

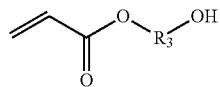

wherein $R_3$ is a linear alkyl of 1 to 50 carbons which may be substituted, an ether or polyether which may be substituted.

12. The capacitor of claim 11 wherein said acrylate is defined by:

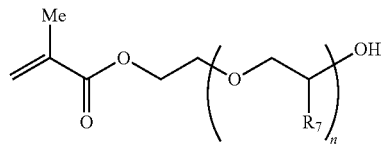

wherein R7 is hydrogen or methyl and n is an integer of no more than 10.

13. The capacitor of claim 11 wherein said acrylate is selected from the group consisting of 2-hydroxyethyl methacrylate, 2-hydroxyethyl acrylate (HEA), 2,2-bis(hydroxymethyl)propyl acrylate;

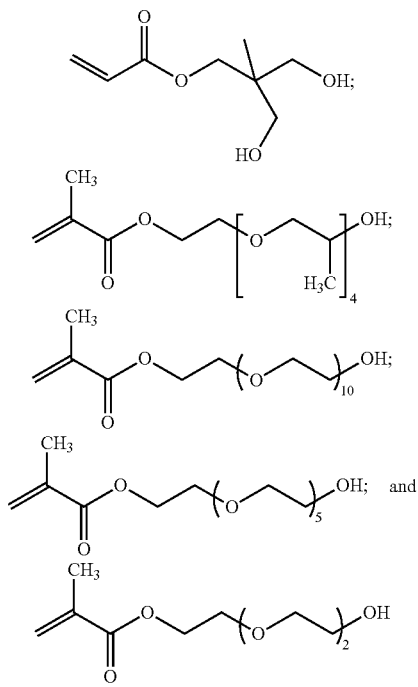

14. The capacitor of claim 7 wherein said linear-hyperbranched polymer is a second reaction product of a hydroxyl amine with said reaction product.

15. The capacitor of claim 14 wherein said hydroxyl amine is defined by

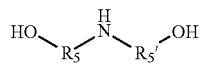

wherein $R_5$ and $R_{5'}$ are independently selected from linear alkyls of 1-6 carbons which may be substituted.

16. The capacitor of claim 15 wherein said hydroxyl amine is selected from:

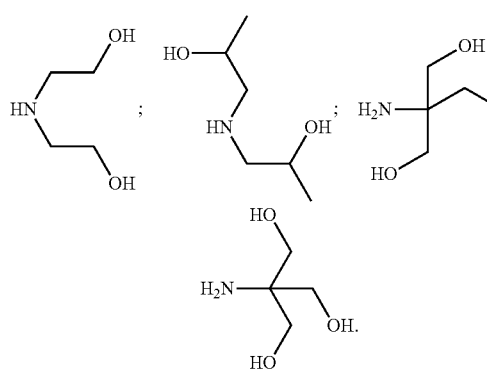

17. The capacitor of claim 3 wherein said linear-hyperbranched polymer comprises at least Generation 1 branching.

18. The capacitor of claim 17 wherein said linear-hyperbranched polymer comprises at least Generation 2 branching.

19. The capacitor of claim 17 wherein said linear-hyperbranched polymer has an acid number of at least 100 to no more than 1000.

20. The capacitor of claim 19 wherein said linear-hyperbranched polymer has an acid number of no more than 200.

21. The capacitor of claim 3 wherein said cathode has a performance additive with no more than 10 wt % sulfonate.

22. The capacitor of claim 21 wherein said performance additive has no more than 0.1 wt % sulfonate.

23. The capacitor of claim 3 wherein said cathode has a performance additive with no more than 10 wt % primary or secondary amines.

24. The capacitor of claim 23 wherein said performance additive has no more than 10 wt % primary or secondary amines.

25. The capacitor of claim 3 further comprising a cross-linked cathode.

26. The capacitor of claim 25 wherein said cross-linked cathode is a reaction product of said cathode with a crosslinker.

27. The capacitor of claim 26 wherein said crosslinker is selected from a silane and a ethylene glycol diglycidyl ether.

28. The capacitor of claim 27 wherein said crosslinker is selected from the group consisting of:

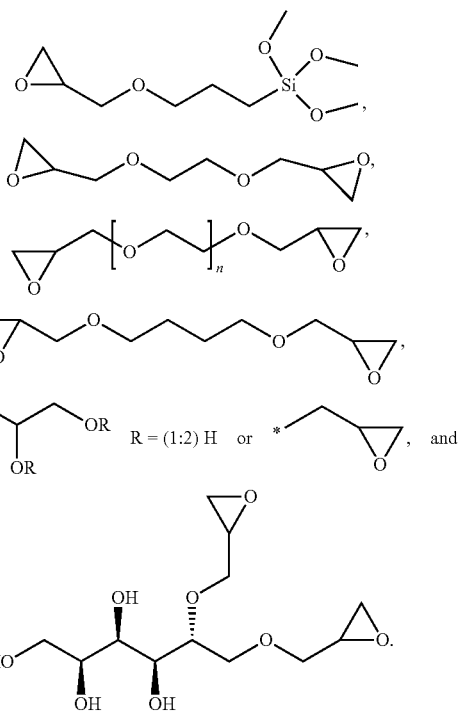

* * * * *